Oct. 8, 1957  J. B. SPELLER ET AL  2,808,987
APPARATUS FOR GENERATING TRIGONOMETRIC FUNCTIONS
Filed Nov. 30, 1953
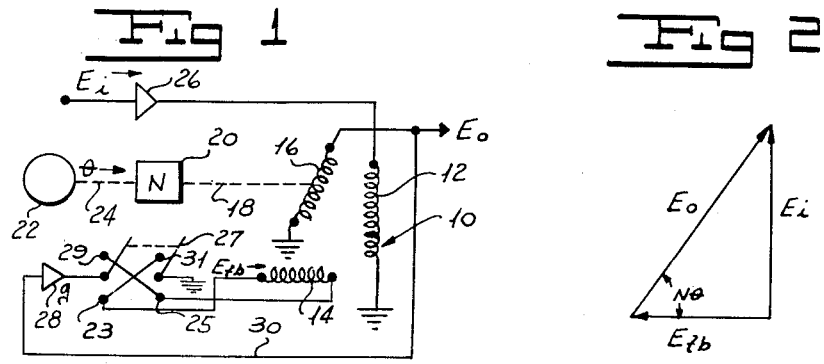
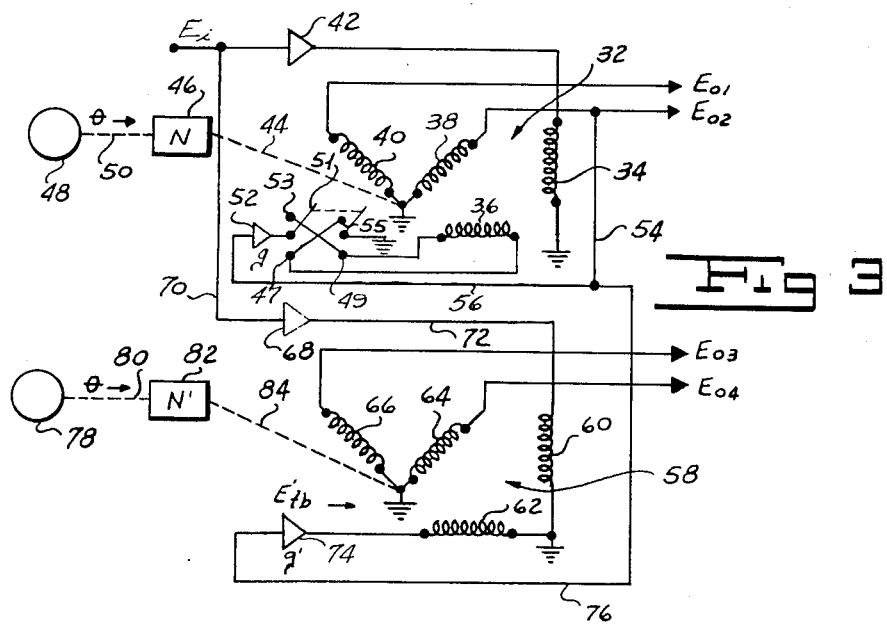
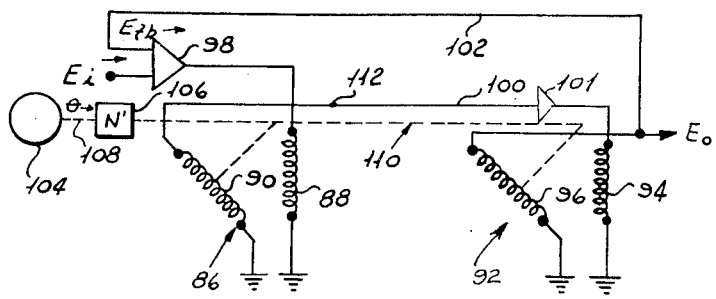
INVENTORS
JACK B. SPELLER
FRANK S. PRESTON
BY
Henry L. Skenier
ATTORNEY United States Patent Office 2,808,987
Patented Oct. 8, 1957

2,808,987

APPARATUS FOR GENERATING TRIGONOMETRIC FUNCTIONS

Jack B. Speller, White Plains, and Frank S. Preston, Tarrytown, N. Y., assignors, by mesne assignments, to Norden-Ketay Corporation, a corporation of Illinois Application November 30, 1953, Serial No. 394,998

5 Claims. (Cl. 235—61)

Our invention relates to a method and apparatus for generating trigonometric functions and more particularly to an improved method and apparatus for generating trigonometric functions other than sine and cosine functions with a high degree of accuracy.

In the field of analogue computers a great number of the relations to be set up on the computer involve the generation of a voltage as some trigonometric function of time or of another voltage or angular displacement. The generation of sinusoidal and other trigonometric functions of variables becomes particularly important in connection with problems involving frequency response tests of automatic control systems. For example, if a signal is available which represents the magnitude of a particular vector quantity and the angular displacement of the vector about a particular axis is known, it may be desirable to generate a tangent or cotangent function of the vector as well as a sine or cosine function.

A suitable device for generating trigonometric functions is a resolver which includes a stator winding and a rotor winding. Resolvers of the prior art are limited in their operation to the generation of sine and cosine functions, and, moreover, the accuracy of the result obtained with these computers is limited by the accuracy built into the resolvers.

We have discovered a means for generating other trigonometric functions than the sine and cosine. The accuracy of our arrangement is such that the result is approximately twice as accurate as the accuracy built into the resolver. Our improved device provides a simple and practical means for obtaining various trigonometric functions other than the sine and the cosine.

One object of our invention is to provide a method and apparatus for generating trigonometric functions other than the sine and cosine functions.

Another object of our invention is to provide a method and apparatus for generating trigonometric functions employing a resolver wherein the accuracy obtained is substantially twice the accuracy specified for the resolver.

Other and further objects of our invention will appear from the following description.

In general, our invention contemplates the provision of a method and apparatus for generating trigonometric functions wherein we employ conventional resolvers. If we desire to generate, for example, a tangent function, we employ a resolver including a pair of stator windings disposed at 90 electrical degrees to one another and at least one rotor winding. We feed a signal voltage proportional to the magnitude of a vector, the function of which it is desired to generate, into one of the windings of the stator. A shaft, such as a servomotor shaft, having an instantaneous displacement which is equal to the instantaneous angular displacement of a vector about the rotor axis of the resolver drives the resolver rotor. As a result of the voltage inputs to the stator windings, a voltage representing the vector function to be produced is induced in the rotor winding. To obtain an input for second of the stator windings, we feed back the output voltage from the rotor through an amplifier to this second winding. We have discovered that in order to produce the tangent function, we must rotate the rotor winding through twice the angular displacement of the vector the function of which it is desired to produce and we must select a gain of minus one for the amplifier associated with the second stator winding. With these conditions, the voltage induced in the rotor winding is the input voltage to the first stator winding times the tangent of the angular displacement of the input shaft. With this arrangement we may also obtain the cotangent function by employing an amplifier with a gain of plus one for feeding the output voltage into the second stator winding. This is the basic form of our invention. By modifying the circuit arrangement and feeding various functions into the second stator winding, we are able to produce other trigonometric functions such as secant, cosecant, and the squares of the various functions.

In the accompanying drawings which form part of the instant specification and which are to be read in conjunction therewith and in which like reference numerals are used to indicate like parts in the various views:

Figure 1 is a schematic view showing the basic resolver circuit for generating the tangent function.

Figure 2 is a vector diagram representing the relationship between the voltages in the resolver windings illustrated in Figure 1.

Figure 3 is a schematic view showing the complete resolver circuit by means of which we obtain various trigonometric functions.

Figure 4 is a schematic view showing the arrangement by means of which we obtain the squares of certain trigonometric functions.

More particularly referring now to Figures 1 and 2, in order to obtain the tangent function we employ a resolver, indicated generally by the reference character 10, and including a pair of stator windings 12 and 14 disposed at 90 electrical degrees to one another and each grounded at one end thereof. A rotor winding 16 is grounded at one end thereof and driven by a linkage 18 from a gear box 20 which, in turn, is driven from any convenient shaft 24 which may be advantageously actuated by a servomotor 22. An amplifier 26 feeds the winding 12 and a second amplifier 28 feeds the winding 14. In order to reverse the polarity of the signal fed to the winding 14 to generate a different function, as will be explained in detail hereinafter, a double pole, double throw switch having cross connected pairs of contacts 23 and 25 and 29 and 31, is connected between amplifier 28 and winding 14. The contact arm assembly 27 of the switch is adapted to contact either of the pairs of contacts 23 and 25 or 29 and 31 to reverse the polarity of the signal impressed by amplifier 28 upon winding 14. A lead 30 connects the resolver output from winding 16 to amplifier 28 to feed back the output signal to the winding 14.

It will be appreciated from an examination of Figures 1 and 2 that a voltage $E_i$ is impressed on winding 12 and a voltage $E_{fb}$ is impressed on winding 14 by the respective amplifiers 26 and 28. As rotor 16 is displaced by linkage 18, a voltage will be induced therein which is the output voltage $E_0$ of the resolver. The relationship between the various voltages in the resolver 10 is shown in the vector diagram of Figure 2 where the angle $\theta$ is measured in a counterclockwise direction from a horizontal reference. It is to be noted that bear box 20 displaces the rotor 16 through an angle which is a multiple N of the shaft displacement of servomotor 22; that is, if we represent an instaneous displacement of the shaft of motor 22 by the angle $\theta$, the corresponding displacement of rotor 16 will be an angle $N\theta$. We may, therefore, write an expression for the resolver output voltage:

(1) $\qquad E_0 = E_i \sin N\theta + E_{fb} \cos N\theta$

We have, however, selected voltage $E_{fb}$ as the output voltage $E_o$ times the gain of amplifier 28 and we may write:

(2) $$E_o = E_i \sin N\theta + gE_o \cos N\theta$$

where $g$ is the gain of amplifier 28. We have discovered that if we select $N=2$ and $g=-1$, we obtain an output voltage which is a tangent function when contact arm assembly 27 engages contacts 23 and 25. Substituting these values in Equation 2, collecting terms and transposing, we obtain:

(3) $$E_o = \frac{E_i \sin 2\theta}{1 + \cos 2\theta}$$

By employing well known trigonometric identities, we may reduce Equation 3 to the form:

(4) $$E_o = \frac{2E_i \sin \theta \cos \theta}{1 + 2\cos^2 \theta - 1} = E_i \tan \theta$$

Therefore, it can be seen that with our resolver circuit and by proper selection of the factors N and $g$, we have produced a tangent function. It is to be noted, moreover, that the accuracy of the resultant function is not limited by the accuracy of the resolver alone but is substantially twice that accuracy. This results from the fact that we employ a particular arrangement of a resolver wherein it is necessary to rotate the resolver rotor through an angle which is twice the angular displacement of the servomotor shaft to produce the tangent.

By a different selection of the amplification factor $g$ of amplifier 28 we are able to produce the cotangent function with the circuit arrangement illustrated in Figure 1. If in Equation 2 we let $N=2$ and $g=+1$, (5) $$E_o = \frac{E_i \sin 2\theta}{1 - \cos 2\theta}$$

Again by employing trigonometric identities, we may reduce Equation 5 to the form:

(6) $$E_o = \frac{2E_i \sin \theta \cos \theta}{1 - 2\cos^2 \theta + 1} = E_i \cot \theta$$

It will be seen we have produced the cotangent function. This function also represents substantially a two to one improvement in accuracy over the specified resolver accuracy, since a multiple $N=2$ was employed in gear box 20.

It will readily be appreciated that we may reverse the polarity of the signal fed by amplifier 28 to the winding 14 to produce a cotangent function by employing an amplifier having a gain of plus one instead of minus one. Conveniently, we employ an amplifier having a fixed gain of minus one and change the polarity of the signal input to winding 14 by means of a double pole switch, the contact arm assembly 27 of which engages a respective pair of the pairs of contacts 23 and 25 or 29 and 31 to produce a tangent function or a cotangent function as desired. The cotangent function may also be produced by changing the polarity of the output winding 16 of the resolver.

In Figure 3 we have shown a detailed circuit arrangement whereby we may obtain various trigonometric functions such as tangents, cotangents, secants, and cosecants. This circuit includes a resolver, indicated generally by the reference character 32, including a pair of stator windings 34 and 36 relatively disposed at 90 electrical degrees and each grounded at one end thereof, as well as a pair of rotor windings 38 and 40, relatively disposed at 90 electrical degrees and having a common ground connection. The input voltage $E_i$ is fed to winding 34 by an amplifier 42. The rotor windings 38 and 40 are positioned by a linkage 44 from a gear box 46 to which the shaft 50 is the input. A servomotor 48 may conveniently drive the shaft 50. The output voltage from winding 38 is fed back through conductors 54 and 56 to an amplifier 52, the output of which is fed to winding 36. In order to reverse the polarity of the signal fed to the winding 36 by amplifier 52, we connect a double pole, double throw reversing switch having a first pair of contacts 47 and 49 cross-connected with a second pair of contacts 53 and 55. The contact arm assembly 51 of the switch is adapted to contact either of the pairs of contacts 47 and 49 or 53 and 55 to reverse the polarity of the signal fed by amplifier 52 to winding 36. It will be appreciated that the portion of the circuit of Figure 3 thus far described is similar to that shown in Figure 1, except for additional rotor winding 40. If the displacement of shaft 50 is $\theta$, the ratio of gear box 46 is two, and the amplification $g$ of amplifier 52 is minus one, the output voltage $E_{o2}$ of winding 38 will be $E_i \tan \theta$, as explained hereinbefore. It will readily be appreciated that since winding 40 is out of phase with winding 38 by 90 degrees, it will have an instantaneous displacement $(2\theta \pm 90°)$ and its output voltage $E_{o1}$ will be $E_i \tan(\theta \pm 45°)$, depending on whether winding 40 leads or lags winding 38. It will also be appreciated from the discussion in connection with Figure 1 that if the gain $g$ of amplifier 52 is plus one, the $E_{o1}$ will be $E_i \cot(\theta \pm 45°)$ and $E_{o2}$ will be $E_i \cot \theta$. The gain of amplifier 52 may readily be changed from minus one to plus one by reversing the switch contact arm assembly 51 from contacts 47 and 49 to 53 and 55.

The remainder of the circuit of Figure 3 has been added to provide a means for generating secant and cosecant functions and includes a resolver, indicated generally by the reference character 58, having a pair of stator windings 60 and 62, grounded at the common connection and disposed at 90 electrical degrees to one another, and a pair of rotor windings 64 and 66 similarly disposed at 90 electrical degrees to one another and grounded at a common point. The input voltage $E_i$ is fed to an amplifier 68 by a conductor 70. The output of the amplifier is fed to winding 60 by a conductor 72. A second amplifier 74 having a gain $g'$ feeds winding 62. We have found that in order to produce secant and cosecant functions the input to winding 62, $E'_{fb}$, should be a tangent or a cotangent function, respectively. Therefore, a conductor 76 connects amplifier 74 to conductor 54 to impress the voltage $E_{o2}$ on the amplifier 74. As explained hereinbefore, $E_{o2}$ is a tangent or a cotangent function, depending upon whether the gain $g$ of amplifier 52 is negative or positive. The polarity of the amplifier is effectively governed by the position of switch contact arm assembly 51, as explained hereinbefore.

We may advantageously provide a servomotor 78 having a shaft 80 which drives a gear box 82 which, in turn, displaces rotor windings 64 and 66 by means of a linkage 84. The shaft 80 is displaced through the angle $\theta$ and gear box 82 has a gear ratio $N'$. It is to be understood of course that the shafts 80 and 50 may be displaced manually if desired.

If we select the gain of amplifier 52 as minus one and the ratio N of gear box 46 as two, the voltage $E_{o2}$ will be $E_i \tan \theta$. Therefore, we have an input voltage to amplifier 68 of $E_i$ and an input $E'_{fb} = E_i \tan \theta$ to the amplifier 74. We have found that in order to produce the secant and cosecant functions, the gain $g'$ of amplifier 74 and the gear ratio $N'$ of gear box 82 should each be selected to be unity. It will be understood that, if desired, a single servomotor having an instantaneous shaft displacement $\theta$ could be substituted for servomotors 48 and 78 to drive both the gear boxes 46 and 82. As a result of the voltages applied to windings 60 and 62, a voltage will be induced in winding 66 which is:

(7) $E_{o3}=E_i \cos \theta + E_i \tan \theta \sin \theta$

Substituting $$\frac{\sin \theta}{\cos \theta}$$

for tan $\theta$ and simplifying, we obtain:

(8) $E_{o3}=E_i \cos \theta + E_i\left(\frac{1-\cos^2 \theta}{\cos \theta}\right)$ This expression may be reduced to the form:

(9) $E_{o3}=\frac{E_i}{\cos \theta}=E_i \sec \theta$

Therefore, we have demonstrated a means and method for obtaining the secant function.

The corresponding voltage in winding 64 under the same conditions will be:

(10) $E_{o4}=E_i \sin \theta + E_i \tan \theta \cos \theta$ or

(11) $E_{o4}=2E_i \sin \theta$

By the use of the circuit illustrated in Figure 3, we are also able to obtain the cosecant function if we select the gain $g$ of amplifier 52 as plus one to produce cotangent functions at $E_{o1}$ and $E_{o2}$. This may readily be accomplished by reversing switch contact arm assembly 51. This voltage induced in winding 64 will then be:

(12) $E_{o4}=E_i \sin \theta + E_i \cot \theta \cos \theta$

Similarly, this expression may be reduced to the form:

(13) $E_{o4}=E_i \sin \theta + E_i\left(\frac{1-\sin^2 \theta}{\sin \theta}\right)=\frac{E_i}{\sin \theta}=E_i \csc \theta$ It will be seen we have provided means for generating the cosecant function. The corresponding voltage in winding 66 will then be:

(14) $E_{o3}=2E_i \cos \theta$

From the foregoing it will be clear that we have shown means for producing all of the remaining basic trigonometric functions, given the sine and cosine.

We are able to produce the squares of the various functions by means of a pair of resolvers in series such as shown in Figure 4. To accomplish this, we employ a first resolver, indicated generally by the reference character 86, and including a stator winding 88 and a rotor winding 90. A second resolver, indicated generally by the reference character 92, includes a stator 94 and a rotor 96. The input voltage $E_i$ is fed to an amplifier 98 the output of which is impressed on the winding 88 of the first resolver 86. A lead 100 connects the rotor 90 of resolver 86 to an amplifier 101 connected with the stator 94 of resolver 92. The voltage appearing across winding 96 which is the output signal Eo is fed back to amplifier 98 by a conductor 102. This amplifier 98 is a summing amplifier with a gain of unity. The shaft 108, which may be positioned by a servomotor 104, drives gear box 106 to rotate rotors 90 and 96 through a linkage, indicated generally by the reference character 110. The shaft displacement of motor 104 is $\theta$ and the ratio N' of gear box 106 is unity. From an examination of Figure 4 it can be seen that the voltage impressed on winding 88 is $E_i+E_{fb}$, and as a result of this voltage, the voltage at a point 112 in line 100 which is the induced voltage in winding 90 will be:

(15) $E_{112}=(E_i+E_o) \cos \theta$ since $E_{fb}=E_o$. This voltage $E_{112}$ is applied to winding 94 by amplifier 101 and results in an induced voltage in winding 96:

(16) $E_o=(E_i+E_o) \cos^2 \theta$

Collecting terms and transposing in Equation 16, we obtain:

(17) $E_o=\frac{E_i \cos^2 \theta}{(1-\cos^2 \theta)}=E_i \cot \theta$

Since the feedback through conductor 102 is $E_o=E_i \cot^2 \theta$ and this voltage is summed with $E_i$ in amplifier 98, the output of amplifier 98 will be:

(18) $E_i+E_i \cot^2 \theta$ or

(19) $E_i(1+\cot^2 \theta)=E_i \csc^2 \theta$

In a similar manner we may obtain squares of the tangent and of the secant.

In use, when it is desired to employ our method of generating a tangent or cotangent function, an input signal voltage $E_i$ proportional to the magnitude of the vector the function of which it is desired to generate is fed into the amplifier 26. The servomotor 22 is displaced through an angle equal to the instantaneous displacement of the vector. If we desire to generate a tangent function, we select an amplifier 28 having a gain $g$ equal to minus one and connect contact arm assembly 27 to contacts 23 and 25. As explained hereinbefore, as a result of feedback through line 30, an output voltage is produced $E_o=E_i \tan \theta$. Similarly, we employ a step-up gear ratio for gear box 20 of $N=2$. Since we displace the rotor winding through an angle which is double the instantaneous displacement $\theta$ of the vector, a result is obtained which is substantially double the accuracy of the resolver employed.

If a secant or cosecant function is to be generated, the arrangement shown in Figure 3 may be employed. A voltage $E_{o2}$ is obtained in the manner discussed in connection with Figure 1. This voltage will be the tangent or cotangent function, depending upon the position of switch arm assembly 51. Assuming the function is a tangent function, the output voltage $E_{o2}$ is fed to amplifier 74 and the input voltage $E_i$ is fed to amplifier 68. Both N', the gear ratio of gear box 82, and the gain $g'$ of amplifier 74 are selected to be unity. This circuit produces an output signal $E_{o3}$ which is the secant function, and $E_{o4}$ which is twice the sine function. If we reverse the position of switch arm assembly 51, we obtain an output $E_{o3}$ which is twice the cosine function and an output $E_{o4}$ which is the cosecant function.

To generate the square of any one of the functions, we employ the arrangement shown in Figure 4. As explained hereinbefore, the input voltage is applied to amplifier 98 and the output voltage Eo fed back by line 102 to amplifier 98. The gear ratio of box 106 is selected as unity so that rotors 90 and 96 are displaced through an angle $\theta$. Then, in the manner explained, the squares of the various functions are obtained. The function obtained depends, of course, on the angular relationships between the rotor and stator windings of the resolvers.

It will be seen that we have accomplished the objects of our invention. We have invented a method and apparatus for generating trigonometric functions other than the sine and the cosine functions. By employing a feedback circuit and a step-up gear ratio from the displacement servomotor, we are able to obtain tangent, cotangent, secant, and cosecant functions. It is to be understood, moreover, that since the mathematical relationships involved demand a rotor displacement which is twice the instantaneous displacement of the vector to be produced, the accuracy of the result obtained is substantially twice the specified accuracy of the resolver employed. Moreover, we have provided an arrangement whereby the squares of various functions may be obtained. Depending upon the particular circuit arrangement, any desired function may now be generated with a high degree of accuracy.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A device for generating trigonometric functions of a signal including in combination a resolver having a rotor winding and a pair of stator windings disposed at ninety electrical degrees to one another, means for feeding a signal to one of said stator windings, means for rotating said rotor winding through an angle which is a multiple greater than unity of the angle whose trigonometric function is desired whereby an output signal is induced in the rotor winding and means for feeding back said output signal to the second stator winding of the resolver, said feedback means having a gain of substantially unity.

2. A device for generating trigonometric functions as in claim 1 including means for reversing the polarity of said output signal.

3. A device for generating trigonometric functions of a signal including in combination a first resolver having a pair of stator windings and a rotor winding, means for feeding an input signal to the first stator winding of the first resolver, means for rotating the rotor winding of the first resolver through twice the angle whose trigonometric function is desired whereby a signal is induced in the rotor winding of the first resolver, means for feeding back the first rotor winding signal to the second stator winding of the first resolver, a second resolver having a rotor winding and a pair of stator windings, means for feeding the input signal to the first stator winding of the second resolver, means for feeding the signal induced in the rotor winding of the first resolver to the second stator winding of the second resolver and means for rotating the second resolver rotor winding through said angle to produce the desired trigonometric function across the rotor winding of said second resolver.

4. A device for generating trigonometric functions as in claim 3 including means for reversing the polarity of the signal induced in the rotor winding of the first resolver.

5. A device for generating trigonometric functions of a signal including in combination a first resolver having a stator and a rotor, means for feeding a signal to the stator of the first resolver, means for rotating the rotor of the first resolver through an angle whose trigonometric function is desired whereby a signal is obtained thereacross, a second resolver including a stator and a rotor, means for feeding the signal from the first resolver rotor to the stator of the second resolver, means for rotating the rotor of the second resolver through said angle whereby an output signal is obtained therefrom and means for feeding back said output signal to the stator of the first resolver.

References Cited in the file of this patent

UNITED STATES PATENTS 2,467,646    Agins _____ Apr. 19, 1949
2,557,811    Brown _____ June 19, 1951

OTHER REFERENCES

Electronic Instruments (Greenwood et al.) 1948, page 131.